United States Patent Office 3,497,473
Patented Feb. 24, 1970

3,497,473
PROCESS FOR THE PREPARATION OF POLY-ETHYLENE TEREPHTHALATE
Jan F. Kemkes, Rheden, Netherlands, assignor to American Enka Corporation, Enka, N.C., a corporation of Delaware
No Drawing. Continuation-in-part of application Ser. No. 309,388, Sept. 17, 1963. This application Nov. 29, 1966, Ser. No. 597,527
Int. Cl. C08g *17/15*
U.S. Cl. 260—75           3 Claims

---

ABSTRACT OF THE DISCLOSURE

This disclosure pertains to a process for preparing polyethylene terephthalate by direct esterification of terephthalic acid using ethylene glycol, comprising an improvement in the esterification reaction, wherein an acid and glycol are esterified in the presence of a prepolymer reaction medium. The improvement consists essentially in esterifying terephthalic acid and a glycol (ethylene glycol) in a mixture of lower molecular weight prepolymeric glycol terephthalates consisting substantially of ethylene glycol esters of terephthalic acid and wherein a molar ratio of esterified terephthalic acid to free and esterified (bound) ethylene glycol (total amount of glycol) in the reaction mixture is critical in that it must be at least 0.55. Esterification of the acid in the medium and in the proportions critical to the invention may be carried out at atmospheric pressure, and preferably at the boiling point of the mixture. The invention has the advantages of (1) the formation of undesirable side-reaction products, such as ether esters, are avoided, (2) the reaction rate is markedly increased, (3) no methanol is evolved, and (4) no catalyst is needed for the esterification to proceed.

Copolymers may also be obtained by merely mixing the starting components with, for example, isophthalic acid, diglycol, propanediol, or 1,4-di-(hydroxymethyl) cyclohexane.

---

This invention relates generally to an improvement in a process for the preparation of polyesters by direct esterification of a dicarboxylic acid using diols followed by polycondensation of the esters thus obtained. The application is a continuation-in-part of U.S. application Ser. No. 309,388, filed Sept. 17, 1963, now abandoned.

While such a process is generally known, in actual practice it has not been used very extensively primarily because esterification of the acid proceeds too slowly. In most cases, the reaction is much too slow for utilization of the process on a commercial scale; consequently, producers heretofore have preferred to start with dimethyl terephthalate (DMT) and react with glycol to obtain a glycol ester suitable for subsequent polymerization purposes. For example, in monomer formation, i.e., diglycol terephthalate

is obtained by transesterifying a glycol (ethylene glycol) using the dimethyl ester of the acid (terephthalic). Condensation of the monomer at a temperature of about 250–300° C., under pressure (usually below 2 mm. of mercury), results in a commercially acceptable high molecular weight linear polymeric product suitable for manufacture of fibers, filaments and film.

Production of the polyesters by heating terephthalic acid with ethylene glycol is by far the simplest route and it has now been found, according to the present invention, that it is possible to overcome the aforementioned slow reaction rate of the acid and glycol heretofore so detrimental to this approach as a means of access to high molecular weight polyesters. It is also possible, using the invention, to avoid formation of undesirable ether esters. Ether esters are usually obtained because of the splitting off of water from two hydroxyl groups of two ethylene glycol molecules with simultaneous formation of an ether bond.

It is therefore a principal object of the present invention to provide an improved esterification reaction in a process producing linear polyesters starting with a dicarboxylic acid and a suitable glycol.

It is a further object of this invention to provide a process for producing a high molecular weight linear polyester starting from terephthalic acid and ethylene glycol.

It is still another object of this invention to provide a process for producing highly polymeric polyesters starting with terephthalic acid and ethylene glycol wherein the reaction rate is substantially increased and wherein undesirable side reactions are in most part completely avoided.

In its broadest sense, the improvement which the invention contemplates is directed to carrying out the esterification reaction of terephthalic acid and the glycol in a solvent prepolymer mixture comprising a medium of glycol esters of terephthalic acid, consisting of diglycol terephthalate (bis (2-hydroxyethyl) terephthalate), and low polymers such as dimers and trimers but not excluding monoglycol terephthalate, and wherein the molar ratio of esterified terephthalic acid to free and esterified glycol in the mixture is at least 0.55 during the entire esterification reaction. While it is known that terephthalic acid (TPA) and glycol are soluble and can be reacted in diglycol esters of terephthalic acid, for example, bis (2-hydroxyethyl) terephthalate (British Patents 775,030 and 776,282), the remarkable effect of the critical range of the major reactant proportions in improving the rate of esterification in prepolymeric mixtures of glycol terephthalates, notwithstanding the fact that glycol degradation is almost completely avoided, is completely unexpected. In the process exemplified in British Patent 776,282, the molar ratio of the amount of esterified acid in solution to the total amount of ethylene glycol is always considerably lower than 0.50. From this known method, it can therefore not be inferred that the reaction rate can be increased considerably by applying a ratio higher than 0.55. In general, the reaction medium and in the proportions defined in the invention completely avoids any formation of side reaction products, such as ether esters, etc. Presence of such side products adversely affects the quality of the polymer in regard to its color and its obtainable molecular weight. A further advantage resides in obtaining high-grade polymers containing a very low number of carboxyl groups.

The process according to the invention further makes it possible to carry out the reaction at atmospheric pressure and high rates of conversion are obtained without the necessity of using high pressures. As one can appreciate, high pressures and temperature require the use of costly pressure-resistant equipment and, moreover, the removal of water liberated in the reaction process requires special process considerations and additional equipment.

The process is preferably carried out at the boiling point of the reaction mixture in order to obtain the highest possible reaction rate. Water and glycol evaporating from the mixture can be condensed, with the recovered glycol subsequently recycled back into the reacting mixture. The amount of glycol to be recovered is quite small, however, and therefore apparatus used may be of relatively simple design as when compared to apparatus normally required and in using conventional processes. No methanol is evolved in the process; therefore, no recovery apparatus therefor is needed.

Drawbacks such as those encountered during polycondensation when starting with dimethyl terephthalate (DMT) and glycol and using a transesterification catalyst are also avoided since no catalyst is necessary to initiate and/or complete esterification. The presence of most known esterification catalysts during the polycondensation often adversely affects the rate of polycondensation and degree of polymerization (condensation), notwithstanding the fact that it contaminates the product obtained.

The process according to the present invention is so conducted that esterification takes place in a reaction mixture wherein the molar ratio between the total amount of esterified terephthalic acid and the total amount of free and esterified glycol is at least 0.55. It is therefore necessary to make use of a reaction medium which substantially consists of a glycol terephthalate mixture and with the total of esterified terephthalic acid in the reaction medium higher than in an equilibrium mixture formed when utilizing pure diglycol terephthalate, bis (2-hydroxyethyl) terephthalate, wherein the molar ratio is 0.50.

It has been discovered that when the process is carried out at the boiling point of the reaction mixture (which increases with the molar ratio), particularly favorable results are obtained if said molar ratio is between 0.55 and 0.75. At those values, the rate of solution of the terephthalic acid in the reaction medium is particularly high so that a very rapid conversion is obtained.

The process according to the present invention may be carried out either batchwise or continuously. A continuous process is preferred, however. Continuous streams of terephthalic acid and glycol therefore can then be fed to a heated mixture of the prepolymer mixture of glycol terephthalates, and a portion of the esterified product can then be continuously withdrawn and thereafter polycondensed in a continuous manner which is known per se.

Since continuous feeding of dry terephthalic acid to the resulting hot reaction mixture may cause the acid to become too tacky (caused by glycol vapors condensing on contact with the cold acid), it is preferred to (1) withdraw a portion of the reaction mixture, (2) after cooling, adding thereto terephthalic acid and ethylene glycol, and (3) thereafter feeding the resulting mixture to the hot reaction mixture. Alternatively, the terephthalic acid may first be suspended in ethylene glycol, thereafter adding the resulting suspension to the reaction mixture while removing excess glycol by distillation. Another method which gives very good results is in mixing the terephthalic acid and the glycol (in the required amounts) and then portioning, in measured amounts, the paste obtained to the reaction mixture by means of an extruder screw.

When using a continuous process, the relative feed rates of the acid and the glycol will naturally be adjusted so that the composition of the reaction mixture is kept substantially constant in order to least satisfy the aforementioned requirement as to molar ratio. This, of course, implies that if all the evaporating glycol (after being condensed) is to be recycled, the terephthalic acid and the glycol must be introduced at such a rate that the molar ratio between the two components is at least 0.55.

The reaction product obtained by the esterification reaction conducted according to the present invention is suitable for continuous or batch condensation techniques. The reaction can be accelerated using one or more of any of the well-known polycondensation catalysts. Catalysts such as those mentioned in U.S. Patent No. 2,647,885 and 2,534,028 are quite suitable.

The process according to the present invention may also be used for preparation of copolymers of polyethylene terephthalate (PET) wherein PET is the major constituent. The copolymers may be obtained by mixing with the starting materials a small amount of another acid, such as isophthalic acid, or possibly another glycol, such as diglycol, propanediol, or 1,4-di(hydroxymethyl) cyclohexane.

In addition to the above-described process, the present invention includes the products prepared using the process including articles of manufacture such as filaments, fibers and films.

In order that the invention be understood more fully, the following examples are given. It is understood, however, that they are presented by way of illustration only and are not intended to limit the scope of the invention.

EXAMPLE I

A round 2-liter flask provided with a stirrer, a temperature regulator, a funnel for feeding solid matter, a funnel for feeding liquid matter, and a packed fractionating column which is arranged to be kept at 105° C. is used.

A series of reactions are carried out in media consisting of a prepolymeric mixture of glycol esters of terephthalic acid consisting essentially of bis (2-hydroxyethyl) terephthalate.

The molar ratio of esterified (bound) terephthalic acid to both free and esterified (bound) glycol in these solvents or media is referred to as the "$f$-value."

After a given amount of the medium has been introduced into the flask and heated to the boiling temperature, terephthalic acid is added.

In experiments (a) to (c) inclusive (see that table below), the reaction takes place without the addition of glycol. The reaction causes the composition of the reaction mixture to change so that, because of the condition of equilibrium being set up, the "$f$-value" increases.

In experiments (d) to (h) inclusive, apart from the ethylene glycol recycled from the fractionating column, additional glycol is added so that the chosen "$f$-value" is maintained.

In all the experiments, water is distilled off at atmospheric pressure.

The table below gives a recapitulation of the reaction conditions and the time necessary for the added terephthalic acid to dissolve. The table also includes the rate of solution of the terephthalic acid calculated per liter of reactive volume.

The medium in the experiments (d) to (h) inclusive is prepared by mixing pure bis (hydroxyethyl) terephthalate monomer having an *f*-value of 0.5 and pure mono (hydroxyethyl) terephthalate having an *f*-value of 1.0.

TABLE

| Experiment | Medium[1] in grams | *f*-Value during reaction | Terephthalic acid in grams | Reaction temp., °C. | Rate of solution | |
|---|---|---|---|---|---|---|
| | | | | | Time in minutes | Rate mol/hr./lite |
| a | 372 | 0→0.167 | 166 | 200 | 360 | 0.38 |
| b | 502 | 0.167→0.333 | 166 | 205 | 205 | 0.54 |
| c | 632 | 0.333→0.500 | 166 | 215 | 125 | 0.69 |
| d | 967 | 0.555 | 332 | 230 | 89 | 1.11 |
| e | 942 | 0.588 | 332 | 240 | 61 | 1.66 |
| f | 917 | 0.625 | 332 | 250 | 48 | 2.16 |
| g | 892 | 0.667 | 332 | 260 | 38 | 2.80 |
| h | 867 | 0.714 | 332 | 280 | 25 | 4.37 |

[1] Media consisting of lower molecular weight prepolymer including substantially ethylene glycol terephthalates with the exception of Experiment A, where the medium is pure ethylene glycol.

Experiments (a) to (c) inclusive are carried out successively and in such a manner that the reaction product of each experiment is employed as the reaction medium in the succeeding experiment.

The table shows that the rates of conversion are low if (as in experiments (a) to (c), inclusive), the composition of the reaction medium is not in accordance with that used in the process according to the present invention.

In experiments (d) to (h), use is made of a composition required for conducting the process according to the present invention and, as a result, the reaction rates are much higher than in the comparative experiments (a) to (c) inclusive.

After the addition of 0.015% of antimony oxide (calculated on the basis of diglycol terephthalate), the reaction products obtained in the experiments (d) to (h) inclusive are polycondensed at 280° C. in vacuo in a closed stainless steel vessel, thereby obtaining colorless or practically colorless polymers having melting points between 254° and 256° C.

The product obtained by polycondensing the reactants achieved in experiments (a) to (c) inclusive gives, under the same reaction conditions, a polymer having a melting point of 241° to 244° C. This relatively low melting point is believed caused by the presence of ether groups which are formed during the long esterification period.

EXAMPLE II

There is admitted (per minute) into a feed vessel, provided with a stirrer and a continuous metering device for terephthalic acid, 83 g. ethylene glycol, 149 g. terephthalic acid, and 1000 g. of a reaction medium consisting essentially of glycol esters of terephthalic acid, and having an "*f*-value" of 0.667. In this way a suspension is obtained having an overall "*f*-value" of 0.555. This suspension is pumped, via a heat exchanger, to the base of a cylindrical reactor, the temperature being increased to 260° C. During the reaction process, water formed (32 g./min.) is continuously discharged, and separated from the glycol in the fractionating column over the reactor (being held at approximately 105° C.). The glycol is then continuously recycled to the reactor. After a residence time of 30 to 40 minutes, the reaction mixture becomes homogeneous, and is then discharged at the top of the reactor and collected in a vessel being maintained at a temperature of 230° C. From this vessel 200 g. per minute is collected as the reaction product; the remainder is recycled to the feed vessel. The reaction product obtained may, in the presence of a polycondensation catalyst, then be readily polycondensed, either continuously or batchwise, into a high grade polyethylene terephthalate.

The reaction mixture which is employed in the process of the present invention is usually obtained by mixing terephthalic acid, glycol, i.e., ethylene glycol, and glycol esters of terephthalic acid, for example, bis (2-hydroxyethyl) terephthalate and lower polymers such as dimers and trimers. The glycol ester of terephthalic acid may be the monoglycol ester thereof (mono-2-(hydroxyethyl) ester) which has an "*f*-value" of 1.0. By adding a predetermined amount of glycol and terephthalic acid to the monoglycol ester, a reaction mixture may be obtained having an "*f*-value" of, for instance, 0.60.

The reaction according to the present invention is preferably carried out continuously and with the polymer obtained being directly spun into threads, such as tire yarns or other continuous filaments. A great advantage of such a continuous process is that the yarns obtained have a lower content of carboxyl groups than yarns obtained by conventional discontinuous processes. For certain applications, a low content of carboxyl groups is desirable.

While specific examples of preferred methods embodying the present invention have been described above, it will be apparent that many changes and modifications may be made in the details of the methods of procedure without departing from the true spirit of the invention. It will therefore be understood that the particular methods set forth above are intended to be illustrative only, and are not intended to limit the scope of the invention which is defined by the following claims.

What is claimed is:

1. In the process of preparing polyethylene terephthalate wherein terephthalic acid is esterified with ethylene glycol, the improvement wherein said esterification is conducted at atmospheric pressure, at the boiling point of the reaction mixture and in a solvent medium of glycol esters of terephthalic acid, the molar ratio of total esterified terephthalic acid to the total free ethylene glycol and bound ethylene glycol in the reaction mixture being between 0.55 and 0.75 during the entire esterification reaction.

2. A process according to claim 1 followed by subjecting the ester mixture obtained to polycondensation.

3. A process according to claim 1 wherein the esterification reaction mixture contains a small amount of at least one other compound selected from the class consisting of isophthalic acid, diglycol, propanediol, and 1,4-di-(hydroxymethyl) cyclohexane.

References Cited

UNITED STATES PATENTS

| 3,427,287 | 2/1969 | Pengilly | 260—75 |
| 3,070,575 | 12/1962 | Cramer | 260—47 |

FOREIGN PATENTS

| 676,372 | 7/1952 | Great Britain. |
| 775,030 | 5/1957 | Great Britain. |

JOSEPH L. SCHOFER, Primary Examiner

C. A. HENDERSON, Jr., Assistant Examiner